W. WEBSTER.
SPRINKLER.
APPLICATION FILED AUG. 1, 1913.
1,114,079.
Patented Oct. 20, 1914.
2 SHEETS—SHEET 1.
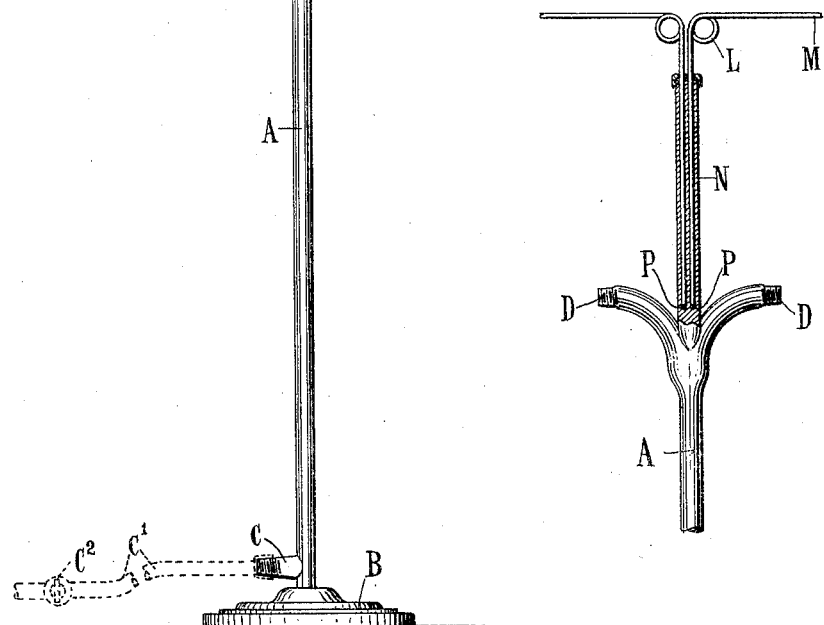

W. WEBSTER.
SPRINKLER.
APPLICATION FILED AUG. 1, 1913.

1,114,079.

Patented Oct. 20, 1914.
2 SHEETS—SHEET 2.

Witnesses.

Inventor,
William Webster,
per
Attorney.

UNITED STATES PATENT OFFICE.

WILLIAM WEBSTER, OF LONDON, ENGLAND.

SPRINKLER.

1,114,079.  Specification of Letters Patent.  Patented Oct. 20, 1914.

Application filed August 1, 1913. Serial No. 782,430.

*To all whom it may concern:*

Be it known that I, WILLIAM WEBSTER, a subject of the King of Great Britain, and resident of 44 Munster Square, Regents' Park, London, N. W., England, have invented certain new and useful Improvements in Sprinklers, of which the following is a specification.

This invention relates to sprinklers for distributing water or other liquids in a diffused condition, as for example for use in watering lawns and for other horticultural purposes, or for any other purpose requiring a liquid to be sprinkled or sprayed over a wide area.

It is the object of the invention to provide a simple and inexpensive form of sprinkler which will fulfil the requirement of throwing a liquid in a diffused condition and distributing it approximately evenly over a wide area. This object is attained by using a length of flexible piping with a nozzle at the free end thereof, and by arranging that there shall be a considerable length of the piping flexibly supported so that it shall be free to take up a great variety of forms and positions in order to direct said nozzle and the liquid issuing therefrom in directions which will be continually changing.

Further objects, and the means adopted for attaining them, will be apparent from the following description.

Figure 3:
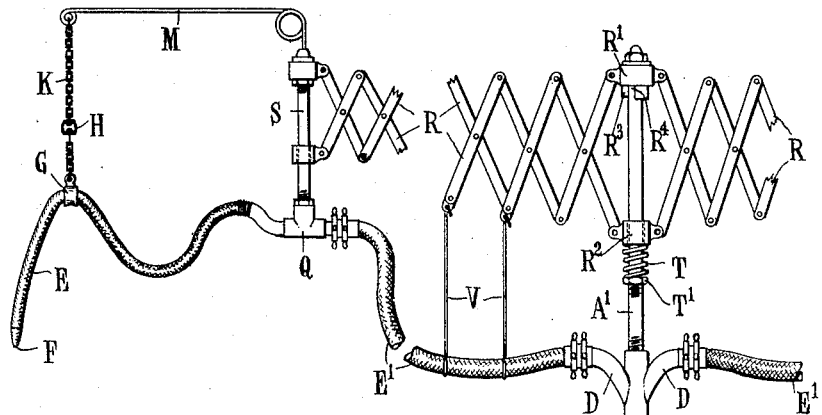
Figure 4:
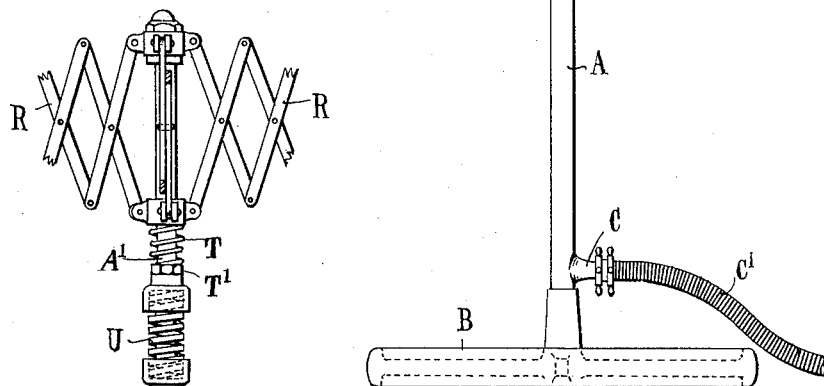
Figure 5:
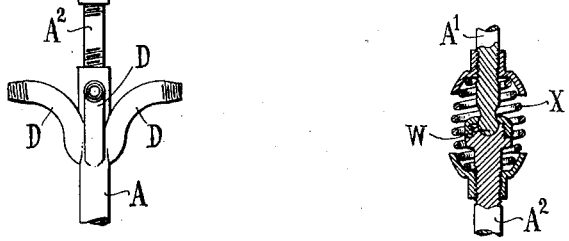

In the drawings, Figure 1 shows one form of the apparatus in side elevation; Fig. 2 is a detail view partly in section illustrating a modification; Fig. 3 is a side elevation partly broken away showing another form of the apparatus; and Figs. 4 and 5 are detail views illustrating further modifications.

The same reference letters indicate corresponding parts in all the figures.

Referring first to Fig. 1, A represents a stand pipe mounted on a base or support B of any suitable type, and having a fitting C for connection to a source of supply of water or other liquid under a pressure head such as is usually available. A hose pipe may be used as indicated by dotted lines at C' in Fig. 1, to convey the liquid to the stand pipe, the flow of liquid being controlled as required by a cock C². The pipe A is bent over to form a convenient outlet end D to which can be attached, as by screwing thereon, one end of a section of flexible piping E. It is very important that a considerable length of flexible piping should be used, as the distribution of the liquid approximately evenly over a wide area depends upon the contorting action of the liquid under pressure in flowing through this piping and out through the nozzle F at the free end thereof. If the piping E is too short it cannot be greatly contorted by the liquid but tends to stop in one position. I have found that by using a length of say about three feet of flexible rubber piping, and supporting it in a flexible manner near to its free or nozzle end, say about nine inches from the end, admirable results are obtainable while using moderate water pressures well within the range of pressures usually available from a town water supply. The invention is by no means limited to these lengths for the flexible piping, but they are mentioned by way of example only, and they may be varied according to the water pressure available, the section or thickness of the flexible piping, and so forth. For supporting the flexible piping near its free end I use a spring member M with a coiled portion at L and an arm which engages in a socket member N attached to the stand pipe A; the spring member M is free to turn in the socket member N, as for instance by having its end resting on a ball P (Fig. 2) in the bottom of the socket. The outer end of the member M carries a chain K with a swivel joint H in it, and an adjustable clip or collar G for engaging with the piping E. By suitably regulating the flow of liquid to this apparatus, the liquid pressure acting in the piping E may be adjusted so that the liquid will contort this piping into a great variety of sinuous forms which will be continually changing, the liquid being thrown out in all directions and angles of projection, and sprayed approximately evenly over a wide area. The apparatus then operates in the best manner for such purposes as watering lawns. If now the clip G be adjusted slightly nearer to the nozzle end F and the flow of water adjusted so that the pressure is somewhat increased, the free end of the piping E may be caused to be thrown upward rather more than before so that the liquid will be thrown to a greater distance. In this way shrubs and flowers around the lawn or other place on which the apparatus is standing, may be conveniently watered. The spring support M with its chain K permits the length of piping E to turn practically into all directions around the stand pipe A.

In the modification shown in Fig. 2, the stand pipe A has two branches D for connection thereto of two lengths of piping such as E, for which two spring supports M are required, each engaging in a separate socket in the member N.

In the modification shown in Fig. 3, the stand pipe A has two branches D, and in order to increase the range of the sprinkler, the lengths of piping E' are carried outward on frames R each bearing a flexibly supported length of piping E at its end. These frames may be made collapsible, in the example illustrated each consisting of a lazy-tongs construction carrying the spring member M in a socket member S, while bearing a socket Q for holding the flexible piping E' and connecting to it the outermost flexible length of piping E with the nozzle F thereon. The length of piping E' may be hung from the frame R by loops or the like V. In order to permit the frames R to turn to some extent about the stand A if required, owing to the forces brought into play by the contorting lengths of piping, the collars R' R² supporting the frames on the upward extension A' of the stand A may be left free to turn on the member A' to a limited extent. For example the upper collar R' may be notched as at R⁴ to accommodate the head of a stud R³ affixed to the member A', which will allow said collar to turn within the limits of movement of the notch over the stud R³. The lazy tongs frames may also be held extended in a flexible manner so that the contortions of the pipes E at their ends, and the varying forces brought into play thereby, may cause said frames R to expand and contract to a certain extent when in use. For this purpose it is sufficient to support the lower collar R² of the frames R on a spring T which may be adjustably supported on the member A' by a nut T'.

In the modification shown in Fig. 4, the whole of the head portion of the device is made slightly flexible in order to attain a somewhat similar result. The extension of the stand A consists of two members A' and A²; whose ends are separated, the connection between them being formed by a stiff spiral spring U. This figure also indicates a head having frame members R arranged at right angles, while the stand pipe has branches D for the connection of pipes E' and E carried by each frame member R.

In the further modification shown in Fig. 5, the two members A' and A² are connected together by a ball and socket joint W, while a barrel-shaped spring X tends to keep the members in line but permits a certain amount of bending over of the head of the device toward any side.

It will be apparent that the invention is not limited to the precise details of construction set forth, but the only essential feature embodied in all the constructions consists of one or more flexible lengths of piping extending outward laterally from a suitable stand, each length of piping having a nozzle at its free end, and having means of support holding it laterally extended while allowing of a wide range of free contorting movement.

Having thus described my invention what I claim as new and desire to secure by Letters Patent is:—

1. A sprinkler for liquids comprising a stand, a length of flexible piping mounted thereon, and means for connecting the piping at one end to a source of liquid supplied under pressure, said length of flexible piping being free to extend out laterally from the stand in a great variety of sinuous forms, a nozzle at the free end of said flexible piping and means for supporting said flexible piping at a single point at a distance from its free end, the supporting means being such as to leave the piping at liberty to turn freely in all directions around the point of support, while permitting also of a wide freedom of sinuous movement of said piping both behind and in front of the point of support.

2. A sprinkler for liquids, comprising a stand, a length of flexible piping mounted thereon and means for connecting it at one end to a source of liquid supplied under pressure, said length of flexible piping being free to extend out laterally from the stand in a great variety of sinuous forms, a nozzle at the free end of said flexible piping, a springy support revolubly mounted on said stand, means supporting said flexible piping from the springy support at a single point near its free end.

3. A sprinkler for liquids, comprising a stand, a length of flexible piping mounted thereon and means for connecting it at one end to a source of liquid supplied under pressure, said length of flexible piping being free to extend out laterally from the stand in a great variety of sinuous forms, a nozzle at the free end of said flexible piping, and means for supporting said flexible piping at a point near to its free end, said supporting means comprising a chain with a swivel joint therein, a clip holding the piping at the lower end of said chain, a springy support with an arm carrying the chain, and means for carrying said springy support in a revoluble manner on the stand.

4. A sprinkler for liquids comprising a stand, a plurality of lengths of flexible piping mounted thereon, and means for connecting each length of piping at one end to a source of liquid supplied under pressure, each length of piping being free to extend out laterally from the stand in a great variety of sinuous forms, nozzles at the free ends of said lengths of flexible piping and revoluble supports attached to each length of piping separately at a single point near its free end.

5. A sprinkler for liquids comprising a stand having a head portion and a base portion, with means flexibly connecting said portions and normally keeping said head portion in an approximately upright position over the base portion, a plurality of lengths of flexible piping and means supporting them from said head portion of the stand in such manner as to leave each length of the piping free to be contorted into a great variety of forms by the flow of liquid therethrough, means for supplying liquid under pressure to said flexible piping, and nozzles at the outer ends of the respective lengths of piping.

6. A sprinkler for liquids comprising a stand having a head portion and a base portion, with a joint permitting of turning in all directions from a mid position connecting said head portion to the base portion thereof, and a spring member tending normally to hold said head portion approximately in an upright position, a plurality of lengths of flexible piping and means supporting them from said head portion of the stand in such manner as to leave each length of the piping free to be contorted into a great variety of forms by the flow of liquid therethrough, means for supplying liquid under pressure to said flexible piping, and nozzles at the outer ends of the respective lengths of piping.

7. A sprinkler for liquids comprising a hollow stand, a plurality of arms revolubly mounted thereon, a plurality of lengths of flexible piping each supported at a single point intermediate its ends by one of said arms, the connection being such as to permit the piping to move in all directions about the point of support, said lengths of piping being connected at one end to the hollow stand, means for connecting the hollow stand to a source of liquid supplied under pressure, and nozzles at the free ends of the lengths of piping.

8. A sprinkler for liquids comprising a stand with a plurality of arms, each formed as a lazy tongs frame, extending laterally therefrom, spring means for holding said lazy tongs frames extended, a plurality of flexible pipes and means for carrying them upon said arms in such manner as to permit them to take up a great variety of sinuous forms, and means for conveying liquid under pressure to said flexible pipes.

9. A sprinkler for liquids comprising a stand with a plurality of arms extending laterally therefrom, and means supporting said arms on the stand in such manner as to permit turning movement of the arms relatively to the stand, a stop limiting said turning movement, a plurality of flexible pipes and means for carrying them upon said arms in such manner as to permit them to take up a great variety of sinuous forms and means for conveying liquid under pressure to said flexible pipes.

In witness whereof, I have hereunto signed my name this 18th day of July 1913 in the presence of two subscribing witnesses.

WILLIAM WEBSTER.

Witnesses:
HUBERT A. GILL,
HENRY WILLIAM BLAKE.

Copies of this patent may be obtained for five cents each, by addressing the "Commissioner of Patents, Washington, D. C."